United States Patent
McElwain

[15] 3,691,865
[45] Sept. 19, 1972

[54] DEFORMABLE STEERING COLUMN ASSEMBLY

[72] Inventor: John C. McElwain, Rochester, Mich.

[73] Assignee: North American Rockwell Corporation, Pittsburgh, Pa.

[22] Filed: Dec. 28, 1970

[21] Appl. No.: 101,659

[52] U.S. Cl. ................................................. 74/492
[51] Int. Cl. ............................................. B62d 1/18
[58] Field of Search ............................... 74/492, 493

[56] References Cited

UNITED STATES PATENTS

| | | | |
|---|---|---|---|
| 3,454,397 | 7/1969 | Yoshioka et al. | 74/492 |
| 3,329,040 | 7/1967 | Stein | 74/492 X |
| 3,486,395 | 12/1969 | Yoshioka | 74/492 |

FOREIGN PATENTS OR APPLICATIONS

| | | | |
|---|---|---|---|
| 1,269,907 | 6/1968 | Germany | 74/492 |

Primary Examiner—William F. O'Dea
Assistant Examiner—F. D. Shoemaker
Attorney—John R. Bronaugh, Floyd S. Levison, E. Dennis O'Connor and Richard A. Speer

[57] ABSTRACT

A motor vehicle steering column assembly having at least two distinct shaft elements interconnected by a flexible coupling. The coupling includes a pair of deformable members, each secured to an end of one of two shaft elements, so that the shaft elements normally are held in an end to end, spaced apart relationship along a common axis. The coupling further includes an axial instability prompting, arcuate element positioned between the adjacent shaft element ends and causing the coupled shaft element ends to become laterally displaced while remaining coupled upon an axially compressive load sufficient to deform the coupling elements being applied to the assembly.

10 Claims, 3 Drawing Figures

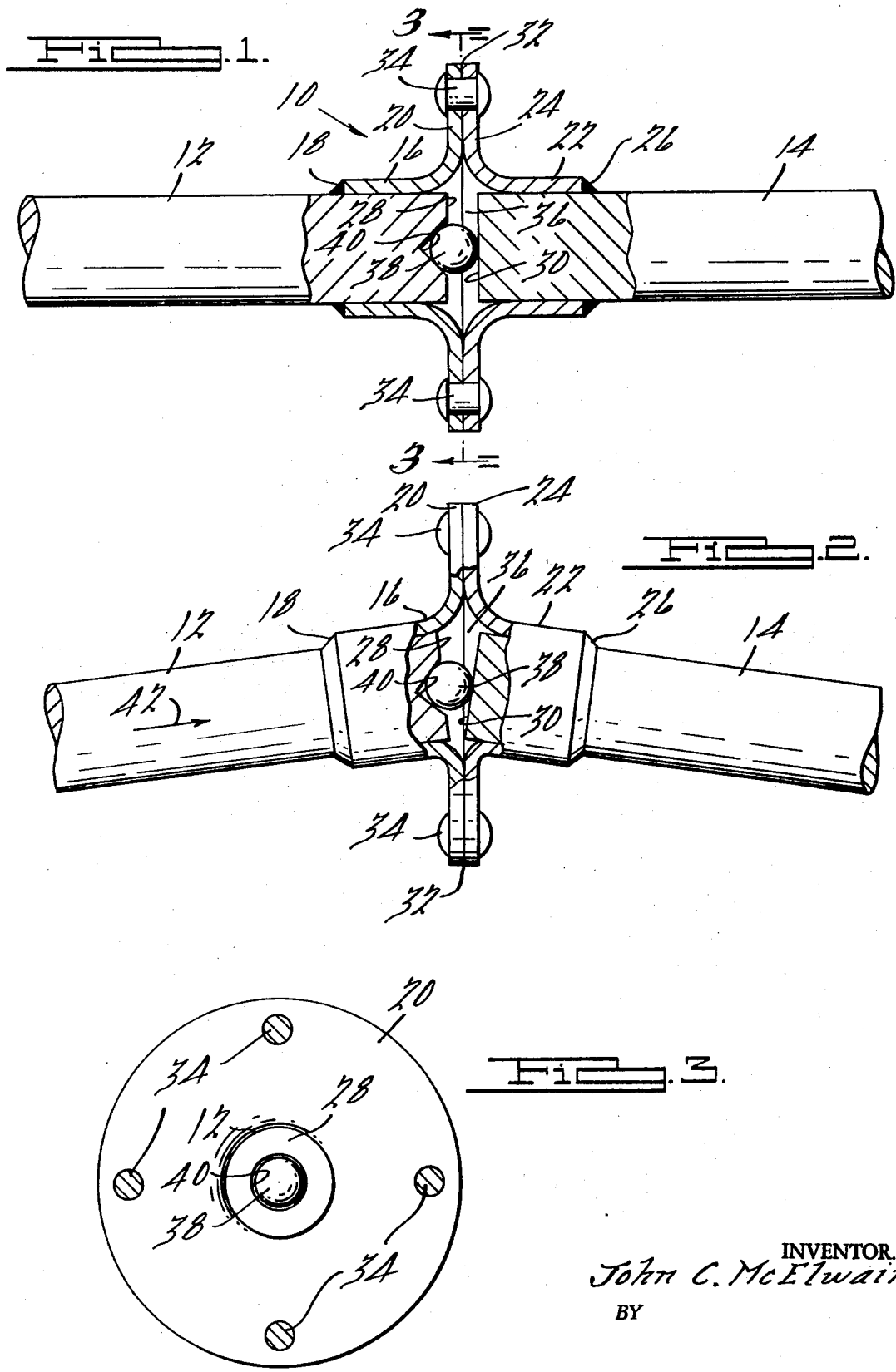

DEFORMABLE STEERING COLUMN ASSEMBLY

BACKGROUND OF THE INVENTION

Collapsible steering shaft column assemblies for motor vehicles are well known and are used extensively on current model passenger and truck type vehicles. Such steering columns generally employ telescoping parts that allow only a limited amount of axial deformation. In order to permit greater axial deformations, two-piece steering columns such as that disclosed by U.S. Pat. No. 3,477,307 issued Nov. 11, 1969, have been proposed wherein the two shaft elements are connected by a frangible coupling that allows axial misalignment of the shaft elements and thus isolates the movement of one shaft element from the other shaft element. A possible drawback to such an arrangement is that a shaft element end, subsequent to being freed from the frangible coupling, cannot be controlled as to its movement and may intrude into a vehicle area the inviolatability of which is desired.

It is an object of this invention to provide a multiple element steering column assembly wherein axial misalignment of the coupled shaft elements may occur to allow greater axial deformation when said column is axially loaded, but that maintains the coupled relationship between the shaft elements to avoid the possible occurrence of a free shaft element end intruding undesirably into certain areas of the associated vehicle. Also, the coupling included in the assembly of this invention has a simple and reliable design and includes a minimum of parts, thereby allowing ease and economy of manufacture and assembly.

DESCRIPTION OF THE DRAWING

FIG. 1 is a side elevational view, partially in section, of a deformable steering column assembly constructed in accordance with this invention;

FIG. 2 is a view similar to FIG. 1 but showing said assembly after a substantially axial impact force has been applied thereto; and FIG. 3 is a sectional view taken along the line 3—3 of FIG. 1.

DETAILED DESCRIPTION OF THE INVENTION

Referring now in detail to the drawing and in particular to FIG. 1 thereof, the numeral 10 denotes generally the deformable steering column assembly constructed in accordance with this invention. This assembly includes a pair of shafts 12 and 14. These shafts are positioned in substantially axial, end to end relationship. For purposes of example, the end of shaft 14 remote from shaft 12 may be considered as operatively connected to a motor vehicle steering wheel while the end of shaft 12 remote from shaft 14 may be considered as connected to vehicle steering gear. It should be understood, however, that this relationship may be reversed with shaft 12 connected to a steering wheel and shaft 14 to a steering gear.

The end of shaft 12 proximate shaft 14 is received in telescoping relationship within a sleeve 16. Sleeve 16 is secured to shaft 12 for unitary movement therewith by means of a weld 18. Sleeve 16 has an integrally formed, radially extending flange portion 20 projecting therefrom. A sleeve 22, similar in all respects to sleeve 20 and including a flange 24, is secured to the end of shaft 14 that is proximate shaft 12 by means of weld 26.

Sleeves 16 and 22 are so positioned on shafts 12 and 14 respectively that the outer faces of flanges 20 and 24 extend axially beyond the end faces 28 and 30 of shafts 12 and 14 respectively. This arrangement allows sleeves 16 and 22 to function as coupling members between shafts 12 and 14. This coupling is accomplished since sleeves 20 and 24 are brought into intimate contact at the interface 32 that lies in a plane between the shaft ends 28 and 30 and are secured together by means of a plurality of fasteners 34 that may comprise rivets or other suitable fasteners.

The structural arrangement described above provides for the coupling of shafts 12 and 14 by means of the sleeves 16 and 22. These four elements cooperate to define a chamber 36 located between the shaft ends. Within this chamber is located a substantially spherical member comprising a ball 38. Ball 38 partially is received in conical recess 40 formed in end face 28 of shaft 12. The dimensions of the ball 38 and recess 40 are such that the ball normally is in contact both with the sides of the recess 40 and the end face 30 of shaft 14.

Sleeves 16 and 22 are formed from material such as sheet steel that will deform when subjected to forces of the magnitude of the forces transmitted along an automotive steering column when an automotive vehicle is involved in a collision. However, the material from which these sleeves are constructed is rigid so that it can transmit the torque from one shaft to the other that is required for the normal vehicle steering. The coupling between shafts 12 and 14, while a deformable coupling, also is a driving connection for steering purposes.

In the position shown in FIG. 1, the steering shaft assembly 10 functions as a normal torque transmitting vehicle steering column. In the event of a vehicle collision wherein a substantially axial force is transmitted from the front of the vehicle along the common axis of shafts 12 and 14 in the direction indicated by the arrow 42 in FIG. 2, the presence of ball 38 between the shaft ends 28 and 30 will promote axial instability and misalignment with a component of force 42 directed non-axially. This component of force causes a deformation of sleeves 16 and 22 and a subsequent movement of shafts 12 and 14 into the non-axial orientation shown in FIG. 2.

In actual practice, this non-axial orientation will be markedly greater than that shown for purposes of clarity in FIG. 2 with an attendant greater degree of deformation of the coupling sleeves 16 and 22. The movement of shafts 12 and 14 into the non-axial orientation of FIG. 2 is aided by the fact that shaft 14 in a normal vehicle installation, operatively is connected to structure that will resist axial movement of the shaft 14. Also, in actual occurrence shafts 12 and 14 will not be located precisely along the same axis but will be somewhat askew. Thus forces transmitted along the lengths of the shafts inherently will have a non-axial component. Also, it is overwhelmingly possible that force 42 will not be directed precisely along the axis of a shaft but will have a direction that deviates somewhat from a shaft axis. This fact also prompts coupling deformation and non-axial force movement. Furthermore, the presence of ball 38 between the shafts greatly contributes to the axial instability of the shafts when a force such as force 42 is applied thereto. Although ball 38 substantially is spherical, an exact spherical shape will not be achieved in the manufacture of ball 38 nor will a precise flat surface be achieved for end 30 of shaft 14. Such irregularities greatly will contribute to the non-axial movement of the coupling arrangement when this arrangement is subjected to force 42.

The movement of the shafts 12 and 14 into the non-axial position of FIG. 2 with an attendant deformation of parts will absorb a portion of the energy of force 42 and greatly will lessen the propensity for movement of the shaft 14 axially to the right as seen in the drawing. Possible intrusion of shaft 14 in a non-desirable manner into the vehicle passage compartment thus will be impeded. Despite these advantages, the movement of the shafts 12 and 14 into the non-axial orientation of FIG. 2 is not accompanied by a freeing of the ends of either of these shafts. The shaft ends remain interconnected by means of sleeves 16 and 22 and excessive uncontrolled movements of either shaft end are prohibited.

It thus may be seen that this invention provides a motor vehicle steering column assembly including multiple shaft elements and a coupling therebetween that allows axial misalignment of the coupled shaft elements when the assembly is axially loaded, but that maintains the coupled relationship between the shaft elements. The assembly thus is axially deformable and also controls the adjacent ends of the shaft elements despite movement of these elements into a non-axial orientation.

I claim:

1. A steering shaft assembly for a motor vehicle adapted to be connected at one of its ends to a steering wheel and at the other of its ends to steering gear, said assembly including first and second steering shaft pieces normally positioned along a common axis and a deformable coupling interconnecting said shaft pieces and forming a driving connection therebetween, said coupling having first and second deformable coupling elements rigidly secured to the adjacent ends of said first and second shaft pieces respectively, said coupling elements extending from the adjacent ends of said shaft pieces and being permanently secured together such that the adjacent ends of said shaft pieces are spaced apart, and discrete instability promoting means positioned between the adjacent ends of said shaft pieces and causing said shaft pieces to become laterally displaced while remaining coupled upon an axially compressive load sufficient to deform said coupling elements being applied to said shaft assembly.

2. A steering shaft assembly according to claim 1, wherein one of the adjacent ends of said shaft pieces has a depression formed therein, said instability promoting means being received in part in said depression and held therein by the other of the adjacent ends.

3. The steering shaft assembly of claim 1, wherein said instability promoting means comprises an arcuate member normally in contact with both of the adjacent ends of the shaft pieces.

4. The steering shaft assembly of claim 3, wherein said arcuate member is substantially spherical.

5. The steering shaft assembly of claim 1, wherein each of said coupling elements comprises a sleeve, said sleeve having a radially extending flange projecting from one end thereof and one of said shaft pieces projecting into the other end thereof such that the outer surface of said flange is spaced from the shaft piece end received by the flange sleeve.

6. The steering shaft assembly of claim 5, wherein the sleeve flanges are circular with the outer faces thereof abutting, and fastening means permanently securing said flanges together.

7. A deformable coupling interconnecting first and second normally axially aligned shaft elements and forming a driving connection therebetween for the transmission of rotational motion, said coupling having first and second deformable coupling elements secured to adjacent ends of said first and second shaft elements, respectively, said coupling elements extending from the adjacent ends of said shaft elements and being permanently secured together such that the adjacent ends of said shaft elements are spaced apart, and instability promoting means positioned between the adjacent ends of said shaft pieces and causing said shaft elements to become laterally displaced while remaining coupled upon an axial compressive load being applied to at least one of said shaft elements.

8. A coupling according to claim 7, wherein said instability promoting means normally is in contact with both of said adjacent shaft element ends.

9. A coupling according to claim 7 wherein said instability promoting means is substantially spherical.

10. A coupling according to claim 7, wherein each one of said coupling elements include a radially extending flange axially outwardly spaced from the end of the shaft element mounting said one coupling element, the coupling element flanges being secured together by fastening means.

* * * * *